United States Patent [19]

Brunssen

[11] 4,396,809

[45] Aug. 2, 1983

[54] MAINTENANCE TERMINATION UNIT

[75] Inventor: James E. Brunssen, Parsippany, N.J.

[73] Assignee: Bell Telephone Laboratories, Incorporated, Murray Hill, N.J.

[21] Appl. No.: 289,325

[22] Filed: Aug. 3, 1981

[51] Int. Cl.³ .............................................. H04B 3/46
[52] U.S. Cl. ................................................ 179/175.3 F
[58] Field of Search ................. 179/175.3 F, 175.3 R, 179/78; 324/95, 52; 307/252 B, 247 R

[56] References Cited

U.S. PATENT DOCUMENTS 3,636,280  1/1972  Wetzel .............................. 179/175.3
3,940,634  2/1976  Grogan ......................... 307/252 UA

OTHER PUBLICATIONS

Unilateral SW., G.E. Semiconductor Data Handbook, Second Edition, 1963, p. 574.

Bilateral SW., G.E. Semiconductor Data Handbook, Second Edition, 1963, p. 578.

Primary Examiner—Stafford D. Schreyer
Attorney, Agent, or Firm—R. O. Nimtz; S. M. Gurey

[57] ABSTRACT

A maintenance termination unit (10) comprises a voltage sensitive switch (30,50) connected permanently in series with each loop conductor (11,13) and an impedance termination unit (18) connected permanently across the loop conductors. Each voltage sensitive switch (30 or 50) comprises a triac (32) connected in series with a loop conductor (11 or 13), a capacitor (34) and resistor (36) connected across the terminals of the triac, and a bilateral switch (60) connected between one of the terminals and the gate electrode of the triac. In response to a signal having a voltage greater than the threshold voltage of the switch, the capacitor is charged to the threshold voltage, thereupon the capacitor discharges insuring that the triac is gated to the ON state.

6 Claims, 1 Drawing Figure

MAINTENANCE TERMINATION UNIT

BACKGROUND OF THE INVENTION

1. Field of the Invention

This invention relates to telephone subscriber loop testing systems and, in particular, to apparatus for determining whether a fault in the subscriber loop is located on one side of the apparatus or the other.

2. Description of the Prior Art

It is useful to know whether a fault in a telephone subscriber loop is located within a customer's premises or outside the premises so that an appropriate repair/person may be assigned for correcting the fault. A typical method of locating such a fault is disclosed in U.S. Pat. No. 3,636,280 issued Jan. 18, 1972 to Mr. L. E. Wetzel. At the entrance of the subscriber loop to the customer's premises, the subscriber loop is mechanically opened by a switch in response to a signal from a testing source. Thereafter, the opened loop is connected, for the duration of the test, to an impedance termination network.

Another such device is disclosed in U.S. patent application, Ser. No. 273,975, filed June 15, 1981, now U.S. Pat. No. 4,373,121 by Messrs. E. F. Sartori and F. J. Uhrhane, and assigned to the same assignee herein. The Sartori et al application discloses the use of a four-layer diode switch connected permanently in series with each loop conductor and substantially identical impedance termination networks connected permanently between each loop conductor and ground. A problem with such an arrangement arises when the resistance values in the termination networks are changed by lightning strikes because of the ground connections. Furthermore, because the four-layer diode switches cannot be produced, currently, for consistent performance, relaxation oscillation may occur during telephone conversations or signaling and supervision procedures.

SUMMARY OF THE INVENTION

The aforementioned problems are solved by connecting an impedance termination network directly and permanently across the tip and ring conductors of the telephone subscriber loop, thereby avoiding any ground connection at the network.

A voltage sensitive switch is connected adjacent to the termination network, on the customer's side, and permanently in series with each loop conductor. Each voltage sensitive switch comprises a triac connected in series with a loop conductor. A bilateral switch, comprising a zener diode, transistors and steering diodes, is connected between the gate and one of the terminals of the triac. Connected across the terminals of the triac are in series a capacitor and a resistor.

In response to signals normally present in the subscriber loop or in response to a test signal having a voltage greater than the threshold of the voltage sensitive switch, the triac conducts thereby establishing a continuous path between the telephone central office and a telephone set and facilitating tests on the entire loop. In response to test signals having a voltage below the threshold of the voltage sensitive switch, tests can be made on that section of the subscriber loop up to the voltage sensitive switch.

More particularly, in response to a test signal having a voltage greater than the threshold of the voltage sensitive switch, the capacitor is charged to the threshold value determined in part by the aforesaid zener diode. Thereafter, charging current is diverted from the capacitor to turn on the bilateral switch thereby short circuiting the zener diode. Immediately thereafter the capacitor is discharged through the bilateral switch providing the gate current to turn on the triac. The forward voltage drop across the triac is insubstantial in relation to the talking battery applied to the loop.

One advantage of the present invention relates to the use of a bilateral switch; the device need not be marked for polarity thereby permitting flexibility and low cost in installation. Furthermore, because discrete components are used in the bilateral switch, any desired voltage-current characteristic can be produced.

Another advantage of the present invention is the use of a capacitor for providing low impedance bypass of the voltage sensitive switch for longitudinal induction and for ringing signals.

BRIEF DESCRIPTION OF THE DRAWING

The single drawing shows a voltage sensitive switch permanently connected in series with each loop conductor and a termination network permanently connected across the loop conductors.

DETAILED DESCRIPTION

Figure 1:
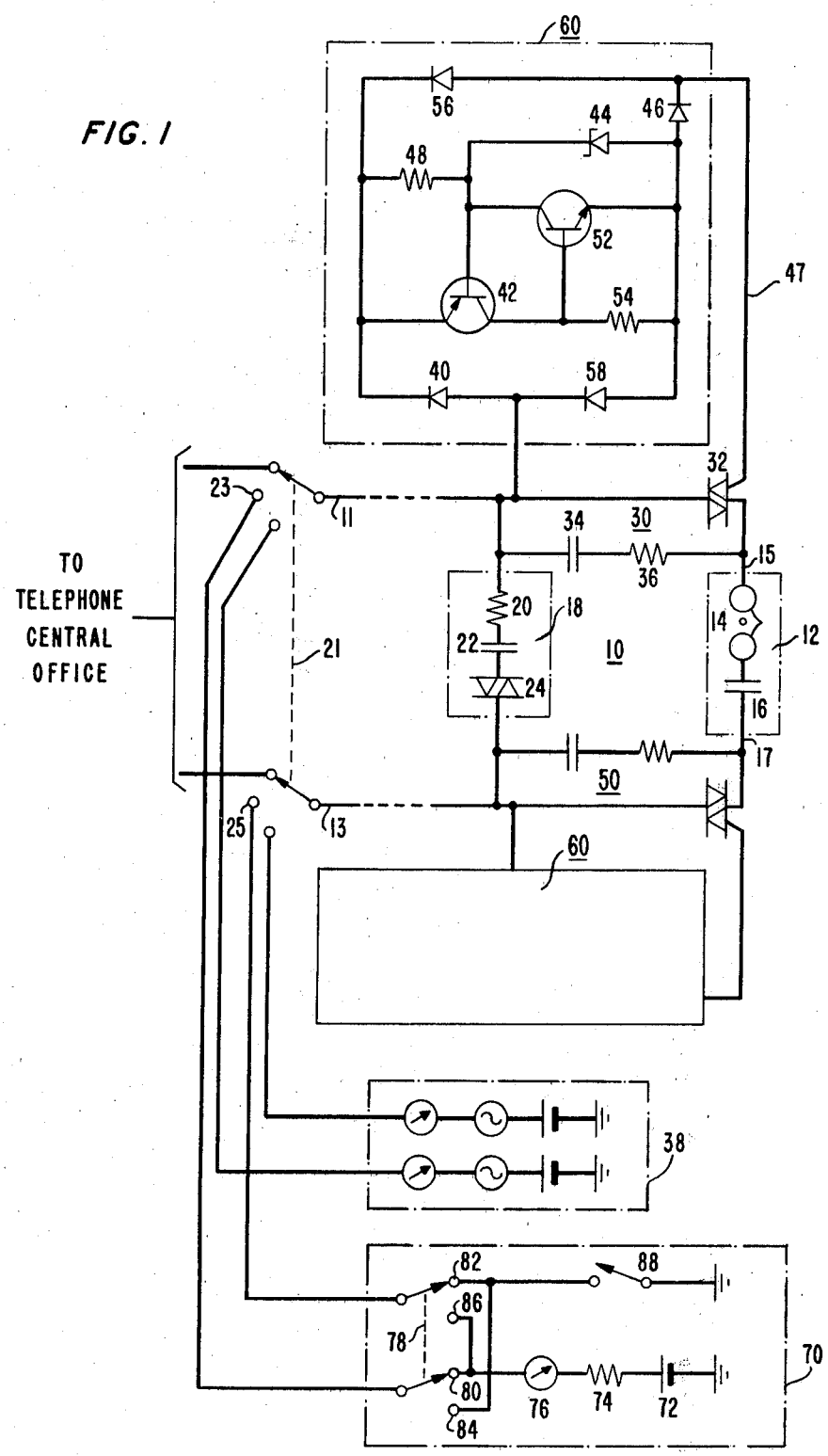

Referring to the drawing, there are shown conductors 11,13 of a telephone subscriber loop connecting a telephone central office (not shown) to a maintenance termination unit (MTU) 10. The MTU 10 is connected by conductors 15,17 of the subscriber loop inside the customer's premises to terminal equipment such as a telephone set 12. The telephone set 12 is shown in the idle state, i.e., on-hook, as comprising a set of ringers 14 and a capacitor 16 connected in series as a termination across the loop conductors 15,17.

The MTU 10 comprises an impedance termination network 18 connected permanently across the loop conductors 11,13. The impedance termination network 18 comprises in series a resistor 20, a capacitor 22 and a varistor 24.

The MTU 10 also comprises substantially identical voltage sensitive switches 30 and 50 connected in series with the loop conductors 11 and 13, respectively. Referring to the voltage sensitive switch 30, there is shown a triac 32 having its terminals connected in series with loop conductor 11,15. Triac 32 functions to switch the loop current and to provide a low forward voltage drop when it is on. Shown connected across the terminals of the triac 32 are, in series, capacitor 34 and resistor 36. Capacitor 34 has many functions: it is a source of gate current for triac 32 through the current limiting resistor 36; it provides for relaxation oscillations when used with a high resistance test source, such as a local test desk; it provides a low impedance bypass of the voltage sensitive switch for longitudinal induction immunity; and, it provides a low impedance bypass for ringing signals, i.e., it keeps the voltage sensitive switch from operating in respose to ringing signals when only one telephone set is connected to the loop.

A direct current test signal is applied from a test apparatus 38, which may be located at the central office or at a location (such as a test center) remote from the central office, on loop conductor 11. When there is a resistive fault, such as a leak from conductor 15 to ground, current begins to charge capacitor 34 to the threshold voltage of the voltage sensitive switch 30. The threshold voltage of the switch 30 is determined by the sum of the forward biased junction voltage drops across the steering diode 40, the emitter-base junction of PNP transistor 42, steering diode 46, the gate circuit of triac 32 and the breakdown voltage of zener diode 44. The threshold voltage should be less than half the value of the direct current talking battery supplied to the loop 11,13.

When the capacitor 34 has been charged to the threshold voltage of switch 30, two events occur. First, the voltage across capacitor 34 is clamped to approximately the voltage across zener diode 44. Thereafter, current is diverted from capacitor 34 through steering diode 40 to provide increased current from the collector of PNP transistor 42. This increased collector current will develop a voltage drop across resistor 54 thereby providing the base voltage to turn NPN transistor 52 on.

Second, when NPN transistor 52 is turned on and saturated, zener diode 44 is effectively short-circuited and the voltage thereacross will be decreased. Thereafter, capacitor 34 discharges producing a current flow through steering diode 40, the emitter-base junction of PNP transistor 42, the collector-emitter junction of NPN transistor 52, and the steering diode 46 onto lead 47 to provide the gate current necessary to turn the triac 32 on. Capacitor 34 is further discharged through resistor 36 to approximately the on-state voltage drop across triac 32. Triac 32 remains in the on-state until the current therethrough is reduced below the holding current level thereof.

The voltage sensitive switches 30 and 50 are bilateral. That is, if a signal with a voltage level greater than the threshold voltage level of the switch 30 is applied to conductor 15, triac 32 will be turned on.

Current from loop conductor 15 flows through resistor 36 to charge capacitor 34. When the charge on capacitor 34 reaches the threshold voltage of switch 30 as stated hereinabove, the current flow will be diverted from capacitor 34 through the gate circuit of triac 32, steering diodes 56 and 58, and PNP transistor 42 to provide the base electrode potential to turn on NPN transistor 52. When NPN transistor 52 is turned on and is saturated, zener diode 44 will be short-circuited, thereby decreasing the voltage thereacross. Thereafter, capacitor 34 discharges through resistor 36, the gate circuit of triac 32, lead 47 steering diode 56, transistor 42, transistor 52, and steering diode 58. Thus, when the threshold voltage level of switch 30 is reached, the gate current for turning on triac 32 is provided.

Regardless of whether a signal is applied on loop conductor 11 or loop conductor 15, i.e., regardless of the direction of the MTU 10, the triac 32 will conduct when the signal voltage level exceeds the threshold voltage level. Such a bilateral switch is useful for two reasons. First, it is not necessary to mark the direction of an MTU thereby making installation of such a unit easy. Second, a loop test requiring the application of a voltage to one conductor while grounding the other for determining either tip to ring leakage or an open loop is facilitated.

Voltage sensitive switches 30 and 50 are substantially identical, operate in the same way and are designed to break down and conduct in response to normal telephone signals present in the loop.

TESTING PROCEDURE

When it is necessary to locate a fault in subscriber loop 11,13 as being on one side of MTU 10 or the other, a plurality of tests, to be described below as tests A, B, C, D and E, are conducted.

A set of signals comprising a direct current (d.c.) signal having a voltage greater than the threshold voltage of the voltage sensitive switches 30 or 50 and an alternating current (a.c.) signal are applied from a source of these signals to subscriber loop conductor 11 which may be the tip conductor. Simultaneously, a similar set of signals from a separate source is connected to the subscriber loop conductor 13 which may be the ring conductor. The a.c. signal must have a voltage larger than the threshold of varistor 24. This is test A.

If there is a fault such as a leak to ground from conductors 11, or 13, or both, direct current flow will be detected at the test apparatus 38. If there is a fault such as a leak to ground from conductors 15 or 17, switches 30 and 50 will break down and conduct and a direct current flow will be detected at the test apparatus 38. Likewise, in response to the a.c. signal, the impedance of each loop conductor can be determined. If the impedance is less than a predetermined value, it can be inferred that the loop is normal. If the impedance is greater, however, than this predetermined value can be inferred that there is an open circuit.

After the aforesaid test A is completed, one of the set of signals is disconnected from either conductor 11 or 13, leaving that conductor connected directly to ground. The other source of signals remains connected between ground and the other conductor 11 or 13, as described in the aforesaid test A. This is test B. If there is a d.c. fault such as a leak from one conductor to the other, a d.c. current flow will be detected at the test apparatus 38. In response to the a.c. signal, an impedance will be measured. If this impedance value is greater than an expected value, it can be inferred that there is either an open circuit or no terminal equipment connected at the end of the loop 15,17. Test E, to be described hereinbelow, will aid in determining whether there is an open loop or absence of terminal equipment.

It is necessary, furthermore, to determine whether a fault determined hereinabove occurs on one side of MTU 10 or the other. Accordingly, after test B is completed, the sources for the signals are disconnected. A different d.c. signal source is connected between ground and tip conductor 11. Likewise, another d.c. signal source is connected between ground and ring conductor 13. Simultaneously, from each of these sources, d.c. signals having a voltage level below the threshold voltage of voltage sensitive switches 30 and 50 are applied to conductors 11 and 13. This is test C. Because switches 30 and 50 will not conduct, the section of subscriber loop conductors 11 and 13 up to MTU 10 may be tested for faults. If there is a d.c. fault such as a leak to ground from either conductor 11 or 13, d.c. flow will be detected at testing apparatus 38. If d.c. flow is not detected during test C, but was detected during test A, it can be inferred that the fault is located beyond MTU 10. Furthermore, because d.c. flow is detected in each conductor, the particular conductor, if faulty, can be identified.

Likewise, if a leak between the conductors was detected in the aforesaid test B, it becomes necessary to know whether the fault is located before MTU 10 or beyond it. Thus, when test C is completed, the d.c. signal source is disconnected from one of the conductors and that conductor is connected direct to ground. The other d.c. signal source remains connected to the other conductor. This is test D. Because the d.c. signal has a voltage below the threshold voltage of switch 30 or 50, that section of loop 11,13 before MTU 10 can be tested. If a d.c. flow is detected at the test apparatus 38, it is inferred that there is a leak between the conductors 11 and 13 before the MTU 10. If there is no d.c. flow detected in test D but there was a d.c. flow detected in test B, it is inferred that there is a leak between conductors 15,17, i.e., beyond MTU 10.

As stated hereinabove in relation with the aforesaid test B, the impedance measured was compared with an expected value. These expected values correspond with the impedance of a set of ringers in a telephone set, or a plurality of sets of ringers, or other terminal equipment. If the measured impedance is greater than an expected value, it is inferred that the loop is open.

It becomes necessary, however, to determine on which side of MTU 10 the loop is open. Thus, after the aforesaid test D is completed, the d.c. signal source is disconnected and an a.c. signal source is connected between ground and one of the conductors 11 or 13. The other conductor is connected directly to ground. An a.c. signal with a value below the threshold of varistor 24 is applied from the source to the conductor and the impedance measured. This is test E.

If the impedance measured in test E is greater than that measured in the aforesaid test B, it is inferred that there is an open in the loop beyond MTU 10, possibly because no terminal equipment is connected to loop 15,17. If the impedance measured in test E is substantially the same as that in test B, it is inferred that there is an open circuit before MTU 10.

The location of faults as being either before MTU 10 or beyond is useful for several reasons. If the customer owns the equipment beyond MTU 10, it becomes his responsibility to correct the fault. On the other hand, if the telephone company owns all the equipment, it is useful for it to know where the fault is located for assigning an appropriate repairperson to correct the fault.

In another embodiment of the present invention, a simplified test procedure is used. Referring to the drawing, there is shown connected to loop conductors 11,13 a test apparatus 70 through switch 21. A battery 72, one end of which is grounded, is connected through resistor 74 and meter 76 to tip conductor 11 through terminal 23 of switch 21. Switch 21 may also connect test apparatus 38 or the central office (not shown) to the loop 11,13 by the operation of a control circuit (not shown). Ring conductor 13 is grounded through terminal 25 of switch 21 and by closing switch 88. Battery 72 has a voltage greater than the threshold of voltage sensitive switches 30 or 50.

If the loop conductors 11,13 and 15,17 are continuous having no fault existing therein and having no terminal equipment connected thereto, when switch 78 is closed thereby making contact with terminals 80,82, an instantaneous "kick" by the needle in meter 76 will be observed. The "kick" is caused by transient currents flowing in the cable because of cable capacitance. Thereafter, the needle of meter 76 will return to approximately the zero reading.

If a telephone set 12 were terminated on the loop conductors 15,17 a similar "kick" will be observed. The deflection of the needle in meter 76, in this case however, will be larger than the earlier described loop with no telephone set connected thereto because of the added capacitance of ringer 14. When there is an open in the tip conductor 11 or 15, a reduced "kick", or needle deflection, will be observed.

If there is a leak from tip conductor 15 to ring conductor 17, when switch 78 is closed to make contact with terminals 80,82, current will flow through conductor 11 to charge capacitor 34, with a time constant determined by capacitor 34, resistor 74, and the leakage resistance from tip conductor 15 to ring conductor 17. When capacitor 34 is charged to the threshold voltage of the voltage sensitive switch 30, triac 32 is turned on. Capacitor 34 is then discharged, thereby holding the triac 32 on for a short period determined by capacitor 34 and resistor 36. The value of resistor 74 is selected so that the charging current on conductor 11 is insufficient to hold the triac 32 in the on state. The triac 32 is switched off and capacitor 34 begins to charge. This procedure of periodically charging and discharging capacitor 34 is called relaxation oscillation and is observed by a steady oscillation of the needle in meter 76. Thus, when there is a leak from conductors 15 to 17, there will be an oscillation of the needle in meter 76.

The aforesaid needle oscillation in meter 76 will occur also if there was a resistive fault, such as a leak from either tip conductor 15 to ground or from ring conductor 17 to ground. In order to distinguish between a leak from conductors 15 to 17 and a leak from conductor 15 to ground, a separate test is conducted. As stated hereinabove, battery 72, resistor 74 and meter 76 remain connected to tip conductors 11 (and 15). Switch 88, however, remains open. If there was a resistive fault, such as a leak from tip conductor 15 to ground, the aforesaid relaxation oscillation will occur and the needle in meter 76 will oscillate. If there was a leak from tip conductor 11 to ground, the needle in meter 76 will remain at one steady position.

In order to determine a leak from ring conductor 17 to ground, switch 78 is operated to rest on terminals 84,86. Battery 72, resistor 74 and meter 76 will now be connected to ring conductors 13 (and 17) and tip conductors 11 (and 15) will remain open. If there was a leak from ring conductor 17 to ground, the aforesaid relaxation oscillation will occur and the needle will oscillate in meter 76. If there was a leak from ring conductor 13 to ground, the needle in meter 76 will remain at one steady position.

What is claimed is:

1. A maintenance termination unit (10) connected in series with a telephone subscriber loop comprising tip conductor (11) and ring conductor (13) for determining whether a fault in said subscriber loop is located on the telephone set (12) side or the central office side of said maintenance termination unit, said maintenance termination unit comprising an impedance termination network connected across said tip and ring conductors, a first voltage sensitive switch (30) responsive to the magnitude of signals on and connected in series with said tip conductor, a second voltage sensitive switch (50) responsive to the magnitude of signals on and connected in series with said ring conductor, said first and second voltage sensitive switches being substantially identical, each of said voltage sensitive switches comprising a triac (32) comprising first and second terminals and a gate lead (47) said terminals being connected in series with said tip or ring conductor, a bilateral switch (60) connected between one of said terminals and said gate lead of said triac, and a capacitor (34) and a resistor (36) connected across said first and second terminals of said triac.

2. The maintenance termination unit according to claim 1 wherein
said bilateral switch (60) comprises a unilateral switch connected within a bridge comprising first (40), second (58), third (56) and fourth (46) steering diodes for permitting current to flow through said bilateral switch in either one of two directions.

3. The maintenance termination unit according to claim 2 wherein
said unilateral switch comprises a first (42) and second (52) transistors so that the base of said first transistor is connected to the collector of the second transistor and the collector of said first transistor is connected to the base of said second transistor,
first resistor (48) connected across the base and emitter electrodes of said first transistor,
second resistor (54) connected across the base and emitter electrodes of said second transistor, and
a zener diode (44) connected across the collector and emitter electrodes of said second transistor.

4. The maintenance termination unit according to claim 3 wherein
said first steering diode (40) is connected between either said first or second terminals of said triac and the emitter electrode of said first transistor (42),
said second steering diode (58) is connected between said first steering diode and the emitter electrode of said second transistor,
said third steering diode (56) is connected between the emitter electrode of said first transistor and said gate lead of said triac, and
said fourth steering diode (46) is connected between the emitter electrode of said second transistor and said gate lead of said triac.

5. The maintenance termination unit according to claim 4 wherein
said capacitor (34) has a capacity for being charged up to the threshold voltage value of said voltage sensitive switch said capacity being
(a) the sum of the values of the forward biased voltage drops across said first and fourth steering diodes, the emitter-base junction of said first transistor, the gate junction of said triac and the zener voltage of said zener diode, or
(b) the sum of the values of the forward biased voltage drops across said third and second steering diodes, the emitter-base junction of said first transistor, the gate junction of said triac and the zener voltage of said zener diode.

6. The maintenance termination unit according to claim 5 comprising
means (42,44,52) for discharging said capacitor (34) when said threshold voltage level is reached thereby providing a negative resistance characteristic and insuring that said voltage sensitive switch will switch to the ON state.

* * * * *